United States Patent [19]

Payne et al.

[11] Patent Number: 5,013,786

[45] Date of Patent: May 7, 1991

[54] FILLER-CONTAINING POLYAMIDE MOLDING MATERIALS HAVING AN IMPROVED SURFACE AND IMPROVED COATABILITY

[75] Inventors: Robert Payne, Ludwigshafen; Walter Goetz, Kaiserslautern; Uwe Wolf, Heidelberg, all of Fed. Rep. of Germany

[73] Assignee: Basf Aktiengesellschaft, Ludwigshafen, Fed. Rep. of Germany

[21] Appl. No.: 308,458

[22] Filed: Feb. 10, 1989

[30] Foreign Application Priority Data

Feb. 12, 1988 [DE] Fed. Rep. of Germany ....... 3804392

[51] Int. Cl.$^5$ .............................................. C08L 77/00
[52] U.S. Cl. ................................... 524/514; 523/400; 525/183; 525/184
[58] Field of Search ....................... 524/514; 523/400; 525/184, 183

[56] References Cited

U.S. PATENT DOCUMENTS

| | | |
|---|---|---|
| 2,071,250 | 2/1937 | Carothers . |
| 2,071,251 | 2/1937 | Carothers . |
| 2,130,498 | 9/1938 | Klemschofski et al. ................ 61/10 |
| 2,130,523 | 9/1938 | Carothers . |
| 2,241,322 | 5/1941 | Hanford . |
| 2,312,966 | 3/1943 | Hanford . |
| 2,512,606 | 6/1950 | Bolton et al. . |
| 3,393,210 | 7/1968 | Speck . |
| 4,500,668 | 2/1985 | Shimizu et al. ..................... 524/514 |
| 4,613,647 | 9/1986 | Yonaiyama et al. ................. 524/514 |
| 4,657,952 | 4/1987 | Kerschbaumer et al. ........... 524/514 |
| 4,798,855 | 1/1989 | Lausberg et al. ................... 524/514 |

FOREIGN PATENT DOCUMENTS

| | | |
|---|---|---|
| 22216 | 9/1981 | European Pat. Off. . |
| 50265 | 8/1983 | European Pat. Off. . |
| 39524 | 10/1983 | European Pat. Off. . |
| 50262 | 11/1983 | European Pat. Off. . |
| 38582 | 5/1984 | European Pat. Off. . |
| 38094 | 7/1984 | European Pat. Off. . |
| 129195 | 8/1985 | European Pat. Off. . |
| 129196 | 9/1985 | European Pat. Off. . |
| 56703 | 12/1985 | European Pat. Off. . |
| 0208197 | 1/1987 | European Pat. Off. . |
| 1694173 | 2/1971 | Fed. Rep. of Germany . |
| 2035390 | 2/1972 | Fed. Rep. of Germany . |
| 2348377 | 11/1975 | Fed. Rep. of Germany . |
| 2444584 | 4/1976 | Fed. Rep. of Germany . |
| 2248242 | 6/1978 | Fed. Rep. of Germany . |
| 2726256 | 8/1983 | Fed. Rep. of Germany . |
| 8600697 | 1/1986 | World Int. Prop. O. . |

Primary Examiner—Paul R. Michl
Assistant Examiner—U. K. Rajguru
Attorney, Agent, or Firm—Oblon, Spivak, McClelland, Maier & Neustadt

[57] ABSTRACT

Filler-containing thermoplastic molding materials having an improved surface and improved coatability contain, as essential components, (A) from 42 to 90% by weight of a thermoplastic polyamide,
(B) from 9.5 to 55% by weight of fibrous or particulate fillers or mixtures of these and
(C) from 0.5 to 3% by weight of a rubber impact modifier having reactive groups.

5 Claims, No Drawings

FILLER-CONTAINING POLYAMIDE MOLDING MATERIALS HAVING AN IMPROVED SURFACE AND IMPROVED COATABILITY

The present invention relates to filler-containing thermoplastic molding materials having improved coatability and containing, as essential components,
(A) from 42 to 90% by weight of a thermoplastic polyamide,
(B) from 9.5 to 55% by weight of fibrous or particulate fillers or mixtures of these and
(C) from 0.5 to 3% by weight of a rubber impact modifier having reactive groups.

The present invention furthermore relates to the use of such molding materials for the production of moldings and films and to the moldings themselves which are obtainable from the molding materials.

Polyamides engineering materials have long been known and are used in many areas as materials for housings or as other components in which not only good mechanical properties but also an attractive appearance are required.

To achieve attractive surface characteristics, shaped articles and moldings obtained from thermoplastic molding materials based on polyamides are therefore frequently coated, i.e. provided with a coating film.

In these case, it is of course desirable to have good adhesion between the coating film and the molding so that the coating film is not destroyed during use in practice.

In many areas, filler-containing polyamides are used as engineering materials since they have the advantage of better rigidity.

However, it is specifically in these products that the coatability is frequently unsatisfactory.

In particular, the adhesion between the coating film and the surface of the finished article is frequently unsatisfactory; moreover, striae are also frequently formed in the surface, adversely affecting the visual appearance of the surface structure.

It is an object of the present invention to provide filler-containing polyamide molding materials which are not inferior to the known filler-containing polyamide molding materials in their mechanical properties but possess improved coatability, in particular substantially better coat adhesion, and a visually more attractive surface.

We have found that this object is achieved, according to the invention, by the filler-containing thermoplastic molding materials as claimed in claim 1.

The novel thermoplastic molding materials contain, as component (A), from 42 to 90, preferably from 50 to 85, in particular from 58 to 70%, by weight of a thermoplastic polyamide.

Semicrystalline or amorphous resins having a weight average molecular weight of not less than 5,000, as described in, for example , U.S. Pat. Nos. 2,071,250, 2,071,251, 2,130,523, 2,130,948, 2,241,322, 2,312,966, 2,512,606 and 3,393,210, are preferably used.

Examples of these are polyamides derived from lactams having 7 to 13 ring members, such as polycaprolactam, polycapryllactam and polylaurolactam, and polyamides obtained by reacting dicarboxylic acids with diamines.

Suitable dicarboxylic acids are alkanedicarboxylic acids of 6 to 12, in particular 6 to 10, carbon atoms and aromatic dicarboxylic acids. Adipic acid, azelaic acid, sebacic acid, dodecanedioic acid and terephthalic acid and/or isophthalic acid are only a few examples of these.

Particularly suitable diamines are akanediamines of 6 to 12, in particular 6 to 8, carbon atoms and m-xylylenediamine, di-(4-aminophenyl)-methane, di-(4-aminocyclohexyl)-methane, 2,2-di-(4-aminophenyl)-propane and 2,2-di-(4-aminocyclohexyl)-propane. Polyamides which are obtainable by copolymerization of two or more of the abovementioned monomers, or blends of a plurality of polyamides, are also suitable.

Furthermore, partly aromatic copolyamides based on caprolactam, adipic acid, hexamethylenediamine, terephthalic acid and/or isophthalic acid may also be mentioned. Examples of these are copolyamidus having repeating units derived from caprolactam and/or adipic acid/hexamethylenediamine on the one hand and terephthalic acid and hexamethylenediamine on the other hand. A particularly suitable preparation process for such products is described in, for example, EP-A 129 195 and EP-A 129 196.

Finally, polyamides which are predominantly or completely derived from units obtained by reacting 1,4-diaminobutane with adipic acid may also be mentioned. Preparation processes for polyamides having this structure are described in, for example, EP-A 38 094, EP-A 38 582 and EP-A 39 524.

The relative viscosity of the polyamides (A) is in general from 2.2 to 5.0, measured in 96% strength by weight sulfuric acid at 25° C. and at a concentration of 1 g of polyamide per 100 ml of sulfuric acid.

The novel filler-containing thermoplastic molding materials contain, as component (B), from 9.5 to 55, preferably from 14.5 to 50, in particular from 15 to 40%, by weight, based on the total weight of components (A) to (C), of fibrous or particulate fillers or mixtures of these.

Typical fibrous fillers are glass fibers, carbon fibers, aramid fibers or fibrous silicates, such as wollastonite. Glass spheres can also advantageously be used.

When glass fibers are used, they may be provided with a size and an adhesion promoter in order to improve compatibility with the polyamide or with the polyester. In general, the glass fibers used have a diameter of from 6 to 20 $\mu$m. These glass fibers can be incorporated both in the form of ground glass fibers and in the form of rovings. In the finished injection molded article, the mean length of the glass fibers is preferably from 0.08 to 0.5 mm.

Other suitable fillers are amorphous silica, asbestos, calcium silicate (in particular wollastonite), aluminum silicate, magnesium carbonate, kaolin (preferably calcined kaolin), chalk, powdered quartz, mica and feldspar. Among these, wollastonite and calcined kaolin are particularly preferred.

The novel molding materials contain, as essential component (C) which is responsible for the improvement in the coatability and the improved surface structure, from 0.5 to 3, preferably from 0.8 to 2.8, in particular from 1.0 to 2.5%, by weight, based on the total weight of components (A) to (C), of a rubber impact modifier which has reactive groups.

Groups of this type are, for example, epoxy, carboxyl, latent carboxyl, amino or amide group: , and also functional groups which can be obtained using monomers of the general formula

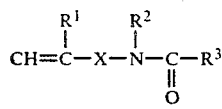

where $R^1$ is hydrogen or $C_1$–$C_4$-alkyl, $R^2$ is hydrogen, $C_1$–$C_8$-alkyl or aryl, in particular phenyl, $R^3$ is hydrogen, $C_1$–$C_{10}$-alkyl, $C_6$–$C_{12}$-alkyl or -$OR^4$, $R^4$ is $C_1$–$C_8$-alkyl or $C_6$–$C_{12}$-alkyl which may be unsubstituted or substituted by O- or N-containing groups, X is a chemical bond, $C_1$–$C_{10}$-alkylene or $C_6$–$C_{12}$-alkyl or

Y is O-Z- or NH-Z and Z is $C_1$–$C_{10}$-alkylene or $C_6$–$C_{12}$-arylene.

The graft monomers described in EP-A 208 187 are also suitable for introducing reactive groups.

Examples of monomers by means of which the stated functional groups can be introduced are glycidyl methacrylate, glycidyl acrylate, allyl glycidyl ether, vinyl glycidyl ether, glycidyl itaconate, acrylic acid, methacrylic acid and their metal salts, in particular alkali metal and ammonium salts, maleic acid, fumaric acid, itaconic acid, vinylbenzoic acid, vinylphthalic acid and monoesters of these acids with alcohols ROH, where R is of not more than 29 carbon atoms and is, for example, methyl, ethyl, propyl, isopropyl, n-butyl, isobutyl, hexyl, cyclohexyl, octyl, 2-ethylhexyl, decyl, stearyl, methoxyethyl, ethoxyethyl or hydroxyethyl. Maleic anhydride and metal salts (in particular alkali metal and alkaline earth metal salts) of polymerizable carboxylic acids and esters of acrylic acid or methacrylic acid with tertiary alcohols, e.g. tert-butyl acrylate, have no free carboxyl groups but show similar behavior to the free acids and are therefore regarded as monomers having latent carboxyl groups.

Further examples are acrylamide, methacrylamide and substituted esters of acrylic acid or methacrylic acid, such as N-tert-butylaminoethyl methacrylate, N,N-dimethylaminoethyl acrylate, N,N-dimethylamiromethyl acrylate and N,N-diethylaminoethyl acrylate.

The amount of the abovementioned monomers or of the groups derived from them is in general from 0.5 to 40, preferably from 1 to 35, in particular from 1 to 25%, by weight, based on the total weight of the rubber.

These monomers can either be copolymerized with the other monomers during the preparation of the rubber itself or be grafted onto a ready-prepared, unmodified rubber (with or without the use of initiator:, for example free radical initiators).

Appropriate processes are familiar to the skilled worker, so that no further information is required here.

A few preferred types of elastomers which may be used according to the invention are described below.

In general, the rubbers are copolymers which preferably consist of two or more of the following monomers as principal components: ethylene, propylene, butadiene, isobutene, osprene, chloroprene, vinyl acetate, styrene, acrylonitrile and acrylates and methacrylates where the alcohol component is of 1 to 18 carbon atoms.

A first preferred group comprises the ethylene-propylene (EPM) or ethylene-propylene-diene (EPDM) rubbers, which preferably have a ratio of ethylene radicals to propylene radicals of from 40:60 to 90:10.

The Mooney viscosities (MLI+4/100° C.) of such uncrosslinked EPM or EPDM rubbers (gel contents generally less than 1% by weight) are preferably from 25 to 100, in particular from 35 to 90 (measured using the large rotor after a running time of 4 minutes at 100° C. according to DIN 53,523).

EPM rubbers generally have virtually no double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimenthylhexa-1,5-diene and octa-1,4-diene, cyclic dienes, such as cyclopentadiene, cyclohexadiene, cyclooctadiene and dicyclopentadiene, and alkenylnorbornenes, such as 5-ethylidene-2-norbornene, 5-butylidene-2-norbornene, 2-methallyl-5-norbornene or 2-isopropenyl-5-norbornene, and tricyclodienes, such as 3-methyltricyclo(5.2.1.0.2.6)-3,8-decadiene, or mixtures of these. Hexa-1,5-diene, 5-ethylidenenorbornene and dicyclopentadiene are preferred. The diene content of the EPDM rubbers is preferably from 0.5 to 50, in particular from 1 to 8%, by weight based on the total weight of the rubber.

EPM and EPDM rubbers are preferably also grafted with reactive carboxylic acids or their derivatives. Acrylic acid, methacrylic acid and its derivatives and maleic anhydride may be mentioned here.

Another group of preferred rubbers comprises copolymers of ethylene with acrylic acid and/or methacrylic acid and/or with the esters of these acids. In addition, the rubbers may also contain dicarboxylic acids, e.g. maleic acid and fumaric acid or derivatives of these acids, such as esters and anhydrides and/or epoxy groups. These dicarboxylic acid derivatives or epoxy groups are preferably incorporated into the rubber by adding to the monomer mixture monomers which contain dicartoxylic acid groups or epoxy groups and are of the general formula I or II or III or IV

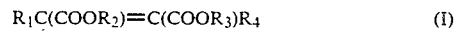

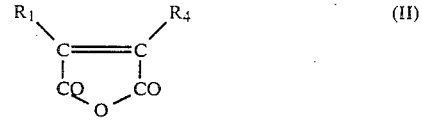

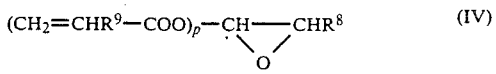

where $R^1$ to $R^9$ are each hydrogen or alkyl of 1 to 6 carbon atoms, m is an integer from 0 to 20, n is an integer from 0 to 10 and p is an integer from 0 to 5.

$R^1$ to $R^7$ are each preferably hydrogen, m is preferably 0 or 1 and n is preferably 1. The corresponding compounds are preferably maleic acid, fumaric acid, maleic anhydride, alkyl glycidyl ethers or vinyl glycidyl ether.

Preferred compounds of the formulae I, II and III are maleic acid, maleic anhydride and epoxy-containing esters of acrylic acid and/or methacrylic acid, glycidyl acrylate and glycidyl methacrylate being particularly preferred.

The ethylene content of the copolymers is in general from 50 to 98% by weight, and the amount of epoxy-containing monomers and the amount of acrylate and/or methacrylate are each from 1 to 49% by weight.

Particularly preferred copolymers are those consisting of from 50 to 98, in particular from 60 to 95%, by weight of ethylene, from 0.5 to 40, in particular from 3 to 20%, by weight of glycidyl acrylate and/or glycidyl methacrylate, acrylic acid and/or maleic anhydride, and from 1 to 45, in particular from 10 to 35%, by weight of n-butyl acrylate and/or 2-ethylhexyl acrylate.

Other preferred esters of acrylic and/or methacrylic acid are methyl, ethyl, propyl, isobvtyl and tert-butyl esters.

Vinyl esters and vinyl ethers can also be used as comonomers.

The ethylene copolymers described above can be prepared by conventional processes, preferably by random copolymerization under high pressure and at elevated temperatures. Appropriate processes are described in the literature.

The melt flow index of the ethylene copolymers is in general from 1 to 80 g/10 min (measured at 190° C. and under a load of 2.16 kg).

Other preferred elastomers (rubbers) (D) are graft copolymers containing reactive groups and having butadiene, butadiene/styrene, butadiene/acrylonitrile and acrylates as the grafting base, as described in, for example, DE-A-16 94 173 and DE-A-23 48 377.

Among these, the ABS polymers as described in DE-A-20 35 390, DE-A-22 48 242 and EP-A-22 216 may be mentioned in particular, those stated in the last-mentioned publication being particularly preferred.

Other graft polymers which may be used as rubber (C) are those consisting of from 25 to 98% by weight of an acrylate rubber having a glass transition temperature of less than $-20°$ C., as the grafting base (base polymer), and from 2 to 75% by weight of a copolymerizable ethylenically unsaturated monomer whose homopolymers or copolymers have a glass transition temperature of more than 25° C., as the graft (grafted shell).

The grafting base comprises acrylate or methacrylate rubbers, and up to 40% by weight of further comonomers may be present. The $C_1$–$C_8$-esters of acrylic acid or methacrylic acid and their halogenated derivatives and also aromatic acrylates and mixtures of these are preferred. Acrylonitrile, methacrylonitrile, styrene, α-methylstyrene, acrylamides, methacrylsmides and vinyl-$C_1$–$C_6$-alkyl ethers may be mentioned as comonomers in the grafting base.

The grafting base may be uncrosslinked or partially or completely crosslinked. Crosslinking is achieved, for example, by copolymerization of, preferably, from 0.02 to 5, in particular from 0.05 to 2%, by weight of a crosslinking monomer having more than one double bond. Suitable crosslinking monomers are described in, for example, DE-A-27 26 256 and EP-A-50 265.

Preferred crosslinking monomers are triallyl cyanurate, triallyl isocyanurate, triacryloylhexahydro-s-triazine and triallylbenzenes.

If the crosslinking monomers have more than 2 polymerizable double bonds, it is advantageous to restrict the amount of these monomers to not more than 1% by weight, based on the grafting base.

Particularly preferred grafting bases are emulsion polymers having a gel content of more than 60% by weight (determined in dimethylformamide at 25° C. according to M. Hoffmann, H. Krömer, R. Kuhn, Polymeranalytik, Georg-Thieme-Verlag, Stuttgart, 1977).

Other suitable grafting bases are acrylate rubbers having a diene core, as described in, for example, EP-A-50 262.

Particularly suitable graft monomers are styrene, α-methylstyrene, acrylonitrile, methacrylonitrile and methyl methacrylate or mixtures of these, in particular mixtures of styrene and acrylonitrile in a weight ratio of from 1:1 to 9:1.

The reactive groups can be introduced into the graft copolymers, for example, by concomitantly using the corresponding monomers in the preparation of the grafted shell. In this case, the amount of these monomers in the graft monomer mixture is preferably from 0.5 to 30, in particular from 1 to 25%, by weight. It is also possible to apply the corresponding monomers separately as a final grafted shell.

The grafting yield, i.e. the quotient of the amount of grafted monomers and the amount of graft monomers used, is in general from 20 to 80%.

Rubbers based on acrylates which can be used according to the invention are described in, for example, DE-A-24 44 584 and DE-A-27 26 256.

The rubbers (C) preferably have a glass transition temperature of less than $-30°$ C., in particular less than $-40°$ C.

It is of course also possible to use mixtures of the abovementioned types of rubbers.

In addition to the essential components (A) to (C), the novel molding materials may contain conventional additives and processing assistants. The amount of these is in general not more than 20, preferably not more than 50%, by weight, based on the total weight of components (A) to (C).

Examples of conventional additives are stabilizers and antioxidants, heat stabilizers and UV stabilizers, lubricants and mold release agents, colorants, such as dyes and pigments, non-reinforcing fillers and plasticizers.

Antioxidants and heat stabilizers which may be added to the thermoplastic molding materials according to the invention are, for example, halides of metals of group I of the Periodic Table, for example sodium halides, potassium halides and lithium halides, if necessary in conjunction with copper(I) halides, for example chloride, bromide or iodide. Sterically hindered phenols, hydroquinones, substituted members of this group and mixtures of these compounds can also be used, preferably in concentrations of not more than 1% by weight, based on the weight of the mixture.

Examples of UV stabilizers are various substituted resorcinols, salicylates, benzotriazoles and benzophenones, which are generally used in amounts of up to 2.0% by weight.

Lubricants and mold release agents, which as a rule are added in amounts of up to 1% by weight, based on the thermoplastic material, are stearic acids, stearyl alcohol, alkyl stearates and stearamides and also esters of pentaerythritol with long-chain fatty acids.

The novel molding materials can be prepared by a conventional process, by mixing the starting components in a conventional mixing apparatus, such as a screw extruder, a Brabender mill or a Banbury mill, and then extruding the mixture. After extrusion, the extrudate is cooled and comminuted, the mixing temperatures are in general from 220° to 350° C., preferably from 230° to 330° C.

Materials according to the invention can also be prepared by a pultrusion process, such as described in EP-A 56 703. In this procedure, the glass fiber strand is impregnated with polymer material and then cooled and comminuted. The glass fiber length in this case is identical to the length of the granules and is from 3 to 20 mm.

Because of their properties, in particular the good coatability, the novel filler-containing thermoplastic molding materials are particularly suitable for the production of moldings which are subsequently coated, for example housing components or the like.

EXAMPLES 1 TO 5

The following components were used for the preparation of filler-containing molding materials.

Component A

Poly-ε-caprolactam having a relative viscosity of 2.7, measured in 96% strength by weight sulfuric acid at 25° C. and at a concentration of 1 g/100 ml (Ultramid ® B 3 from BASF AG)

Component B

Wollastonite (Wollastokup ® 10012 fros NYCO, Willsboro, NY, USA; mean particle size 3.5 μm)

Component C

Ethylene/n-butyl acrylate/acrylic acid copolymer (82% by weight of ethylene, 13% by weight of n-butyl acrylate, 5% of acrylic acid) having a melt flow index MFI (190° C., 2.16 kg) of 10.5 g/10 min Components (A) to (C) were mixed, the mixture was melted in a twin-screw extruder at a melt temperature of 250° C., the melt was extruded and the extrudates were granulated.

Thereafter, moldings were produced from the said granules by the injection molding method, in order to determine the modulus of elasticity according to DIN 53,457 and the notched impact strength according to Izod (ISO A), and the corresponding measurements were carried out.

The coat adhesion was evaluated according to DIN 53,151 (crosshatch test for paints and similar coatings). The surface of the moldings was evaluated visually.

The composition of the molding materials and the results of the investigations are shown in the Table below.

TABLE

| Example No. | Composition (% by weight) | | | Coat adhesion | Surface | Modulus of elasticity according to DIN 53,457 MPa | Notched impact strength according to IZOD (ISO A) J/m at 23° C. |
|---|---|---|---|---|---|---|---|
| | Component A | Component | Component C | | | | |
| 1 | 70 | 30 | 0 | Poor | Striae | 4820 | 73 |
| 2 | 69.5 | 30 | 0.5 | Satisfactory | Some striae | 4845 | 72 |
| 3 | 69 | 30 | 1.0 | Good | Good | 4790 | 74 |
| 4 | 68 | 30 | 2.0 | Very good | Good | 4750 | 75 |
| 5 | 66 | 30 | 4.0 | Good | Satisfactory | 4510 | 86 |

It can be seen that, compared with corresponding molding materials without a rubber having reactive groups, the novel molding materials have unchanged mechanical properties but improved coat adhesion and a substantially improved surface quality.

They have a superior modulus of elasticity compared with materials having higher rubber contents.

We claim:

1. A filler-containing thermoplastic molding material having an improved surface and improved coatability, and containing, as essential components,
   (A) from 42 to 90% by weight of a thermoplastic polyamide,
   (B) from 9.5 to 55% by weight of fibrous or particulate fillers or mixtures of these and
   (C) from 0.5 to 3% by weight of a rubber impact modifier having reactive groups.

2. A filler-containing thermoplastic molding material as claimed in claim 1, wherein the reactive groups in the rubber (C) are epoxy, carboxyl, latent carboxyl, amino or amide groups.

3. A filler-containing thermoplastic molding material as claimed in claim 1, wherein the reactive groups are derived from acrylic acid, methacrylic acid, tertbutyl acrylate, maleic anhydride, glycidyl acrylate or glycidyl methacrylate or a mixture of these.

4. A filler-containing thermoplastic molding material as claimed in claim 1, wherein the rubber (C) is a copolymer of
   from 50 to 98% by weight of ethylene,
   from 0.5 to 40% by weight of glycidyl acrylate, glycidyl methacrylate, acrylic acid or maleic anhydride or a mixture of these, and
   from 1 to 45% by weight of n-butyl acrylate or 2-ethylhexyl acrylate or a mixture of these.

5. A molding obtainable from a filler-containing thermoplastic molding material as claimed in claim 1 as the essential component.

* * * * *